United States Patent [19]

Lorch

[11] Patent Number: 4,488,691
[45] Date of Patent: Dec. 18, 1984

[54] TORSO RESTRAINT SYSTEM

[75] Inventor: Daniel L. Lorch, Holland, Pa.

[73] Assignee: The United States of America as represented by the Secretary of the Navy, Washington, D.C.

[21] Appl. No.: 453,444

[22] Filed: Dec. 27, 1982

[51] Int. Cl.³ .............................................. B64D 25/06
[52] U.S. Cl. .............................. 244/151 R; 297/484; 280/801
[58] Field of Search ........ 244/122 R, 122 B, 122 AG, 244/151 R, 151 A, 151 B; 280/801, 802, 808; 297/484

[56] References Cited

U.S. PATENT DOCUMENTS

| | | | |
|---|---|---|---|
| 2,655,329 | 10/1953 | Martin | 244/122 B |
| 2,664,610 | 1/1954 | Hannemann | 244/122 B |
| 2,868,581 | 1/1959 | Minty et al. | 244/151 B |
| 3,785,597 | 1/1974 | Gaylord | 244/151 A |
| 4,028,948 | 6/1977 | Frost et al. | 244/151 A |
| 4,253,628 | 3/1981 | Marek | 244/151 A |

FOREIGN PATENT DOCUMENTS 2406736 8/1975 Fed. Rep. of Germany ...... 297/484

Primary Examiner—Galen L. Barefoot
Attorney, Agent, or Firm—Robert F. Beers; Henry Hansen; Armand M. Vozzo, Jr.

[57] ABSTRACT

A harness system is disclosed for releasably restraining the torso of a crewman in a seat aboard an aircraft. The harness system includes an upper torso restraint adapted to engage the seat at points on either side thereof and wherein a pair of chest straps connected to either side of a backpad are slidingly routed through respective roller fittings in a criss-cross fashion across the crewman to permit upper torso rotation. A separate lower torso restraint is coupled to the upper torso restraint and adapted to engage the seat at the same points of engagement as the upper torso restraint. A single-action release mechanism, actuated manually or automatically by water immersion, disengages both the upper and lower restraints from the seat thereby divesting the crewman of the harness system.

7 Claims, 6 Drawing Figures

TORSO RESTRAINT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to restraint positioning and protective devices for use in aircraft, and more particularly to an improved torso restraint system for an aircrewman.

In the flight of high-performance aircraft, particularly those of the military, an aircrewman is often subjected to high acceleration or G-loads that may displace him sufficiently out of position to interfere with control of the aircraft. These G-loads, most frequently encountered in flight during high-speed maneuvers, are applied to the crewman in either direction along the longitudinal ($G_x$), lateral ($G_y$) and vertical ($G_z$) axes of the aircraft. In fact, the expected operational accelerations of modern high-performance military aircraft are in the ranges of $\pm 6G_x$, $\pm 3G_y$, $+8G_z$ and $-2G_z$. Thus, firm and reliable inflight retention of aircrewmen aboard such modern aircraft is essential to their functionability and effectiveness as well as to that of the aircraft itself.

Existing inflight restraint systems have performed satisfactorily during the past several years in maintaining proper positioning of aircrewmen subjected to normally encountered flight loads. However, those existing systems have been less effective and less reliable with the advent of higher performance, more maneuverable aircraft, and the resulting increased probability of departure from controlled +G flight. An improved system for restraint of an aircrewman, particularly his torso, is therefore needed to maintain his operational effectiveness aboard currently developing aircraft.

SUMMARY OF THE INVENTION

Accordingly, it is a general purpose and object of the present invention to provide an improved torso restraint system for the aircrewman of a high-performance aircraft.

A more particular object of the present invention is to provide safe and effective inflight retention of the torso of aircrewman generally subjected to high G-loading without interfering with his control of the aircraft.

Another object of the present invention is to provide an aircrewman restraint system capable of lower torso restraint at all times inflight but upper torso restraint only when required during periods of high-acceleration loading, then still allowing sufficient upper body mobility to perform control functions effectively.

Still another object of the present invention is to provide a torso restraint system for an aircrewman that enables him to make a safe parachute landing, if necessary, on the ground or in the water, safely distributing parachute opening loads and permitting quick disconnect from the parachute and other survival equipment on landing.

A further object of the present invention is to provide a torso restraint system that is easily adjustable for all size aircrewman and simple to don and doff.

A still further object of the present invention is to provide a reliable aircrewman restraint system that requires very little maintenance, is economical to fabricate and use, and retrofittable to existing aircraft.

Briefly, these and other objects of the present invention are accomplished by a harness system for releasably restraining the torso of a crewman in a seat aboard an aircraft. The harness system includes an upper torso restraint adapted to engage the seat at points on either side thereof and wherein a pair of chest straps connected to either side of a backpad are slidingly routed through respective roller fittings in a criss-cross fashion across the crewman to permit upper torso rotation. A separate lower torso restraint is coupled to the upper torso restraint and adapted to engage the seat at the same points of engagement as the upper torso restraint. A single-action release mechanism, actuated manually or automatically by water immersion, disengages both the upper and lower restraints from the seat thereby divesting the crewman of the harness system.

For a better understanding of these and other aspects of the present invention, reference may be made to the following detailed description taken in conjunction with the accompanying drawing in which like reference numerals designate like parts throughout the figures thereof.

DESCRIPTION OF THE PREFERRED EMBODIMENT

Figure 1:
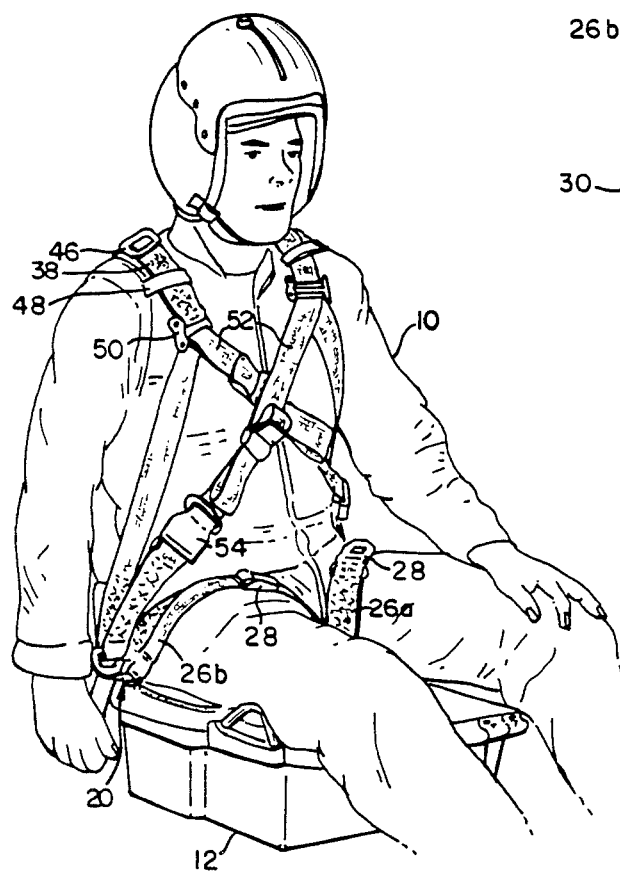
FIG. 1 is a perspective view of an aircrewman restrained in a seated position by the harness system of the present invention.
Figure 2:
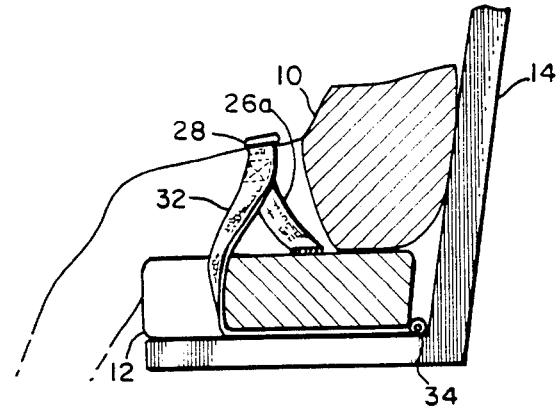
FIG. 2 is a side view of the lower torso of the restrained aircrewman of FIG. 1, partially sectioned to show a portion of the harness system.
Figure 3:
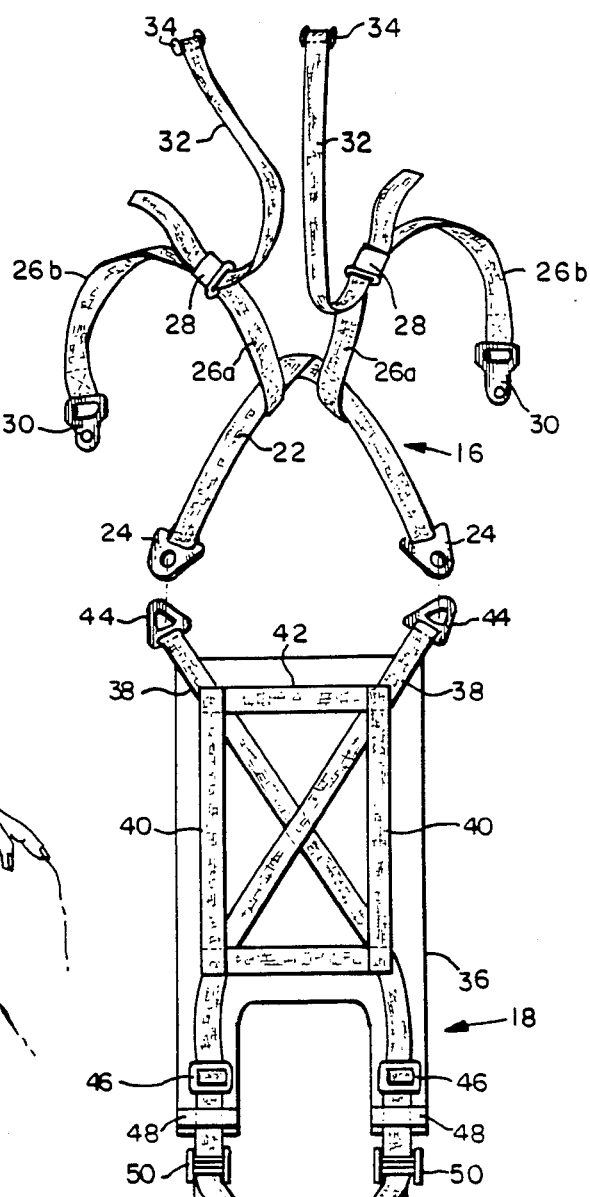
FIG. 3 is a rear view of the harness system of FIGS. 1 and 2 laid out in an extended configuration.

Referring now to FIGS. 1–3, there is shown the harness system of the present invention for releasably restraining an aircrewman 10 upon a seat pan 12 in an aircraft (not shown). Formed having a small section of its forward edge cutout between the legs of aircrewman 10, the seat pan 12 is typically locked within a seat frame 14 suitable for ejection of the aircrewman and may house survival equipment required by the aircrewman upon ejection. In accordance with the present invention, the harness system comprises a lower torso restraint 16 and an upper torso restraint 18 each coupled together and releasably engaged to seat pan 12 by a release mechanism 20 located on either side of the seat pan and described in greater detail hereinafter with regard to FIGS. 4-6.

Best shown in FIG. 3, the lower torso restraint 16 includes a saddle strap 22 fabricated from a length of highstrength webbing, such as nylon. At each end of saddle strap 22, designed to rest upon the seat pan 12 for routing beneath the buttocks of aircrewman 10, is attached a release fitting 24 adapted to engage the release mechanism 20 on either side of seat pan 12. A pair of lower crotch straps 26a, similar in fabrication to saddle strap 22, are sewn at one end thereof to the saddle strap near the middle of its length. Each lower crotch strap 26a is coupled to a corresponding upper crotch strap 26b by a conventional buckle fastener 28 through which the length of the straps may be adjusted for routing upward between the legs and over the thighs of aircrewman 10. Manually connected and disconnected, buckle fasteners 28 also permit the aircrewman 10 to easily don and doff the lower torso restraint 16. A release fitting 30 is attached to each end of the upper crotch strap 26b to permit engagement of the crotch straps with the release mechanisms 20 at opposite sides of the seat pan 12. Similarly to saddle strap 22, the ends of upper crotch straps 26b may be terminated with cloth-reinforced loops as an alternative to use of release fittings 30 for engaging the release mechanisms 20.

Each of a pair of forward anchor straps 32 are attached at one end thereof to respective buckle fasteners 28 alongside the attachment of the lower crotch straps 26a. The forward anchor straps 32 are fabricated similarly to saddle strap 22 and crotch straps 26a and b, and are made having sufficient length to permit routing downwardly and forwardly from their respective points of attachment on buckle fasteners 28, around and under seat pan 12, as more clearly shown in FIG. 2. A spool member 34, typically molded of a plastic material, such as a phenolic resin, is attached at the respective opposite ends of forward anchor straps 32. The spool members 34 are formed to fit between the rear of seat pan 12 and the adjacent edge of seat frame 14 in order to anchor the forward straps 32 in their routed positions during normal flight operations and thereby provide substantial $-G_z$ restraint to aircrewman 10. It should be noted that in the event of an ejection of the aircrewman 10, the spool members 34 are released and the forward anchor straps 32 become free to slide from beneath seat pan 12 for more comfortable suspension of the aircrewman.

The upper torso restraint 18 includes a backpad 36 fabricated of a cloth-covered felt material and formed, typically in a rectangular pattern with a U-shaped cutout at its top edge, to drape substantially the back and shoulders of aircrewman 10 for comfort and support. A pair of back straps 38, disposed in a cross-cross pattern, are sewn to the rear of backpad 36, each back strap extending across the backpad from the bottom to top edge thereof. To support the backstraps 38 in their criss-cross pattern and ensure their attachment to backpad 36, a set of vertical and horizontal support straps 40 and 42, respectively, are secured to the backpad in a rectangular configuration overtop of the backstraps. A pair of release fittings 44, similar to fittings 24, are attached to the respective ends of backstraps 38 adjacent to the bottom edge of backpad 36 to serve as points of engagement with the release mechanisms 20. Cloth-reinforced loops, as previously disclosed, may be used to terminate back straps 38 in place of release fittings 44 for purposes of engaging the release mechanisms 20.

At the top edge of backpad 36 on either side of its U-shaped cutout, each back strap 38 is routed through an adjuster buckle 46, beneath a retainer band 48 attached to the backpad, and secured about the middle one of three separate bars rotatably mounted on a roller fitting 50. Adjuster buckles 46 are conventional devices which together permit both the proper drape of backpad 36 over the shoulders and down the back of aircrewman 10, depending on the length of his torso, and the proper location of the roller fittings 50 in front of the aircrewman below his shoulders. The retainer bands 48, sewn near the top edge of backpad 36 on both sides of the U-shaped cutout, serve to prevent the backstrap 38 from sliding off the shoulders of aircrewman 10 and thereby help to maintain the proper location of the roller fittings 50 on the aircrewman. It should be noted that the top bar of roller fitting 50 may serve as the point of attachment for parachute risers and inertia reel straps (each not shown), and thereby permit the harness system to properly take parachute opening loads after emergency ejection of aircrewman 10.

A pair of chest straps 52 fabricated of a high-strength webbing material are routed through respective roller fittings 50 on either side of the upper torso restraint 18, each chest strap being reeved around the bottom one of the three rotating bars on the roller fitting so that the chest strap slides therethrough. One end of each chest strap 52 is connected to a release fitting 56, similar to release fittings 30, for engaging the release mechanisms 20 at either side of seat pan 12. Slidingly routed through roller fitting 50 as described, each chest strap 52 is secured at its other end to one side of separate buckle fasteners 54, similar to buckle fasteners 28, that permit adjustment of the length of the chest straps extending between the buckle fasteners and release fittings 56. The buckle fasteners 54 releasably couple each chest strap 52 to a lower chest strap segment 52a and permit easy donning and doffing of the upper torso restraint 18 by the aircrewman 10. Release fittings 58, similar to fittings 56, are secured to the respective outside ends of lower chest strap segments 52a for engaging the release mechanisms 20 on either side of aircrewman 10.

Routed upward along each side of aircrewman 10 from respective release mechanisms 20 on either side of seat pan 12 and reeved through respective roller fittings 50 near each shoulder, the chest straps 52 are then routed downward in a criss-cross fashion across the chest of the aircrewman and, via the lower chest strap segments 52a, to the release mechanisms on opposite sides of the seat pan. Such criss-cross routing of chest straps 52 through roller fittings 50 permit the upper torso restraint 18 to provide aircrewman 10 with substantial $-G_z$ restraint while allowing the aircrewman to turn his head and upper torso, when desired, without adjusting the straps.

Figure 4:
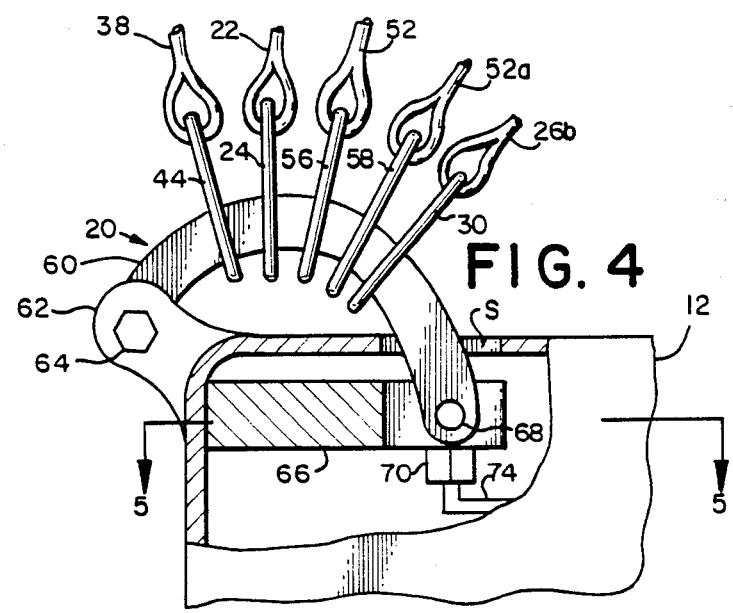
FIG. 4 is an enlarged view of a release mechanism used in accordance with the harness system of the present invention.
Figure 5:
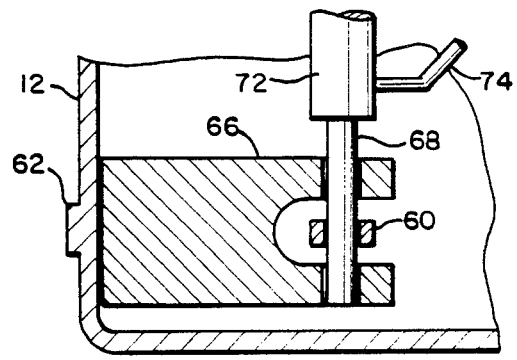
FIG. 5 is a sectional view of the release mechanism taken along the line 5—5 of FIG. 4.

Referring now to FIGS. 4 and 5, there is shown one of the pair of identical release mechanisms 20 that, in accordance with the present invention, provide both a common point of engagement for the lower and upper torso restraints 16 and 18, respectively, on either side of aircrewman 10 and a single-action disengagement of the restraints to divest the aircrewman of the harness system. Mounted at the rear of seat pan 12 on either side thereof, release mechanism 20 includes a curved link 60 about which the release fittings 24, 30, 44, 56 and 58 are engaged to secure the respective straps 22, 26b, 38, 52, 52a of the harness system on both sides of aircrewman 10. Curved to permit proper distribution of strap loads, link 60 is pivotally connected at one end to the back of seat pan 12 on a bifurcated fulcrum post 62 integrally attached to and projecting from the seat pan. A bolt 64 or other conventional axial member may be used to couple the link 60 to post 64 so that the link freely rotates about the post.

The other end of curved link 60 is adapted to fit through a slot S in the top of seat pan 12 and be retained therein until released by actuation. Inside of seat pan 12 adjacent to slot S, the end of link 60 is disposed between a bifurcated portion of a rigid mounting block 66 fixed to the inside rear of the seat pan and having a pair of aligned holes formed through the bifurcated portion. A hole formed near the end of link 60 corresponds to the holes in the bifurcated portion of mounting block 66 and a locking pin 68 is adapted to slide through the corresponding holes and thereby retain the link inside seat pan 12 on each side. Each locking pin 68 is adapted to be removed axially from the corresponding holes of link 60 and mounting block 66 by means of a gas-driven piston member 72 coupled to one end of each locking pin. Each piston member 72 is driven by a controlled supply of high-pressure gas, typically carbon dioxide ($CO_2$), carried in the seat pan 12 and fed to the piston member via a length of tubing 74 and a gas fitting 70.

Figure 6:
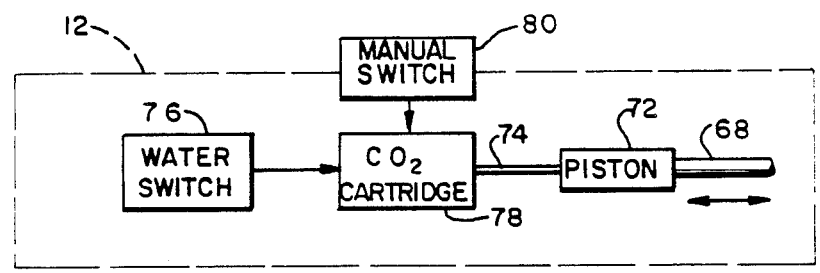
FIG. 6 is a block diagram showing a means for actuating the release mechanism of FIGS. 4 and 5 in accordance with the present invention.

Referring now to FIG. 6, in conjunction with FIGS. 4 and 5 each release mechanism 20 may be actuated automatically by a water-activated switch 76 typically mounted upon seat pan 12 so that in the event of water immersion of the aircrewman 10 after ejection, the switch fires a $CO_2$ cartridge 78 electrically connected thereto, driving each piston member 72 and removing the locking pin 68 from each link 60. A manual switch 80, typically a toggle, mounted on the seat pan 12 in the vicinity of one of the hands of aircrewman 10 may also be provided to fire the $CO_2$ cartridge 78 and actuate the release mechanisms 20. In the event of either automatic or manual actuation of release mechanism 20, removal of the locking pin 68 from each link 60 by piston member 72 permits the link to rotate upward about post 62 and thereby allow disengagement of the separate release fittings 24, 30, 44, 56 and 58 from the link on either side of seat pan 12.

Therefore, it is apparent that the disclosed harness system provides an improved torso restraint system for the aircrewman of a high-performance aircraft, particularly providing safe and effective inflight retention of the torso of the crewman subjected to high G-loading without interfering with his control of the aircraft. The present harness system is capable of lower torso restraint at all times inflight but upper torso restraint only when required during periods of high-acceleration loading, then still allowing sufficient upper body mobility to perform control functions effectively. The present invention provides effective torso restraint for an aircrewman that enables him to make a safe parachute landing, if necessary, on the ground or in the water, safely distributing parachute opening loads and permitting quick disconnect from the parachute and other survival equipment on landing. Furthermore, the present harness system is easily adjustable for all size aircrewman and is simple to don and doff. In addition, the disclosed harness system requires very little maintenance, is economical to fabricate and use, and retrofittable to existing aircraft.

Obviously, other embodiments and modifications of the present invention will readily come to those of ordinary skill in the art having the benefit of the teachings presented in the foregoing description and drawings. It is therefore to be understood that various changes in the details, materials steps, and arrangement of parts, which have been described and illustrated to explain the nature of the invention, may be made by those skilled in the art within the principle and scope of the invention as expressed in the appended claims.

What is claimed is:

1. A harness system for restraining a crewman on a seat in an aircraft, comprising:
   first restraint means adapted to engage the seat at points on either side thereof for restraining the upper torso of the crewman, said first restraint means including a pair of front straps slidingly routed in a criss-cross pattern across the chest of the crewman to permit upper torso rotation and a pair of rollers each reevingly connected to respective ones of said front straps on either side of the crewman to permit said front straps to slide therethrough;
   second restraint means coupled to said first restraint means and adapted to engage the seat at the same points of engagement as said first restraint means for restraining the lower torso of the crewman; and
   release means adapted to be coupled to the seat for disengaging both first and second restraint means from the seat in a single action.

2. A harness system according to claim 1, wherein said first restraint means further comprises:
   a pair of back straps routed in a criss-cross pattern across the back and around the shoulders of the crewman, each of said back straps being adapted at one end thereof to engage the seat and connected at the opposite ends thereof to said rollers; and
   a back pad coupled to said back straps to drape substantially the back and shoulders of the crewman.

3. A harness system according to claim 1, wherein said second restraint means comprises:
   a saddle strap adapted to rest upon the seat and be routed beneath the buttocks of the crewman;
   a pair of crotch straps each attached at one end thereof to said saddle strap and adapted to engage the seat at the opposite end for routing between the legs and over the thighs of the crewman; and
   a pair of anchor straps each attached at one end thereof to the middle of respective ones of said crotch straps and adapted to engage the bottom of the seat, said anchor straps being routed forwardly around and under the seat for $-G_z$ restraint of the crewman.

4. A harness system according to claim 1, wherein said release means comprises:
   a curved link adapted to be pivotally connected to the seat on either side thereof for engaging at a common point said first and second restraint means;
   a pin member adapted to slide through said link to retain said link in a locked position;
   piston means connected to said pin member for removing said pin member from said link;
   a controlled supply of high-pressure gas to drive said piston means; and
   switch means for releasing said controlled supply of high-pressure gas to said piston means.

5. A harness system according to claim 4 wherein said switch means comprises a manual switch.

6. A harness system for restraining a crewman on a seat in an aircraft, comprising:
   a pair of back straps, each formed to releasably engage the seat at a point on either side thereof and routed up the back and other either shoulder of the crewman;
   a pair of rollers, each connected to respective ones of said back straps adjacent to the chest of the crewman;
   a pair of front straps, the opposite ends of each formed to releasably engage the seat at the points, and reeved through respective ones of said rollers; and release means coupled to both pairs of said front and back straps for disengaging said straps from the seat at said points in a single action.

7. A harness system according to claim 6, further comprising:

a saddle strap adapted to rest upon the seat and to be routed beneath the buttocks of the crewman;

a pair of crotch straps, each attached at one end to said saddle strap and formed for routing between the legs and over the thighs of the crewman; and a pair of anchor straps, each attached at one end to the middle of respective ones of said crotch straps and formed to releasably engage the bottom of the seat, said anchor straps being routed forwardly around and under the seat for $-G_z$ restraint of the crewman.

* * * * *

UNITED STATES PATENT AND TRADEMARK OFFICE
CERTIFICATE OF CORRECTION

PATENT NO. : 4,488,691
DATED : December 18, 1984
INVENTOR(S) : Daniel L. Lorch

It is certified that error appears in the above—identified patent and that said Letters Patent are hereby corrected as shown below:

Column 6, line 41, change "1" to -- 2 --.

Signed and Sealed this

Sixteenth Day of July 1985

[SEAL]

Attest:

DONALD J. QUIGG

Attesting Officer     Acting Commissioner of Patents and Trademarks